United States Patent
Wang et al.

(10) Patent No.: US 8,825,653 B1
(45) Date of Patent: Sep. 2, 2014

(54) CHARACTERIZING AND MODELING VIRTUAL SYNTHETIC BACKUP WORKLOADS

(75) Inventors: Yijian Wang, Cary, NC (US); Philip N. Shilane, Yardley, PA (US); Fabiano C. Botelho, Sunnyvale, CA (US); Dhanabal Ekambaram, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 103 days.

(21) Appl. No.: 13/616,978

(22) Filed: Sep. 14, 2012

(51) Int. Cl.
*G06F 7/00* (2006.01)

(52) U.S. Cl.
USPC ........................................................ 707/737

(58) Field of Classification Search
CPC .............. G06F 17/30598; G06F 17/30; G06F 17/30705; G06F 17/30038; G06F 17/30743; G06F 17/30017; G06F 17/3007; G06F 17/30091; G06F 17/30241; G06F 17/30303; G06F 17/30312; G06F 17/30554
USPC ........................................................ 707/737
See application file for complete search history.

(56) References Cited

U.S. PATENT DOCUMENTS

2010/0076934 A1\* 3/2010 Pershin et al. ................ 707/640
2011/0055171 A1   3/2011 McNutt

OTHER PUBLICATIONS

Tarasov, Vasily, et al., "Generating Realistic Datasets for Deduplication Analysis", 2012 USENIX Annual Technical Conference, Jun. 13-15, 2012, Boston, MA, USA, (pp. 1-12).

\* cited by examiner

*Primary Examiner* — Truong Vo
(74) *Attorney, Agent, or Firm* — Blakely, Sokoloff, Taylor & Zafman, LLP

(57) ABSTRACT

Embodiments of this invention are directed to a system and method for characterizing and modeling a virtual synthetic file system workload. In one embodiment, a virtual synthetic system is adapted to select a first location in a prior generation dataset of a first cluster and generate a first offset using a distance distribution function. Thereafter, the virtual synthetic system selects a second location in the prior generation dataset of a second cluster, wherein the second location is offset from the first cluster by the first offset. Finally, the virtual synthetic system modifies each cluster selected on the prior generation dataset thereby creating a next generation dataset. This process is repeated to generate multiple generations of a dataset. Other embodiments are also described herein.

16 Claims, 7 Drawing Sheets

CHARACTERIZING AND MODELING VIRTUAL SYNTHETIC BACKUP WORKLOADS

FIELD OF INVENTION

Embodiments of the present invention relate generally to data storage systems. More particularly, embodiments of the invention relate to generating synthetic data that parallels real-world data manipulation.

BACKGROUND

In modern computer systems, a file system stores and organizes computer files to enable a user to efficiently locate and access requested files. File systems can utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the primary data storage devices or a data storage service company. Data can be added to the storage system at any frequency and at any amount.

In a traditional backup system, the system bundles an entire file system—including both changed and unchanged data—into a single consolidated backup file and sends the consolidated backup file to backup storage at a backup server. In a virtual synthetic system, only modified files are sent to storage at a protective server. At the protective server of the virtual synthetic system, the virtual synthetic backup file is created using a file recipe (i.e., a blueprint for the construction of the file) by combining the changed data received from a client with the unchanged data already residing at the protective server. Consequently, performance of a virtual synthetic system is sensitive to the locations of changed data. Because changed data in real world file systems tends to be localized within small regions of the entire file system, simulating data changes that are also localized within small regions of a synthetic file system provides more accurate performance indicators by paralleling real world scenarios.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1A:
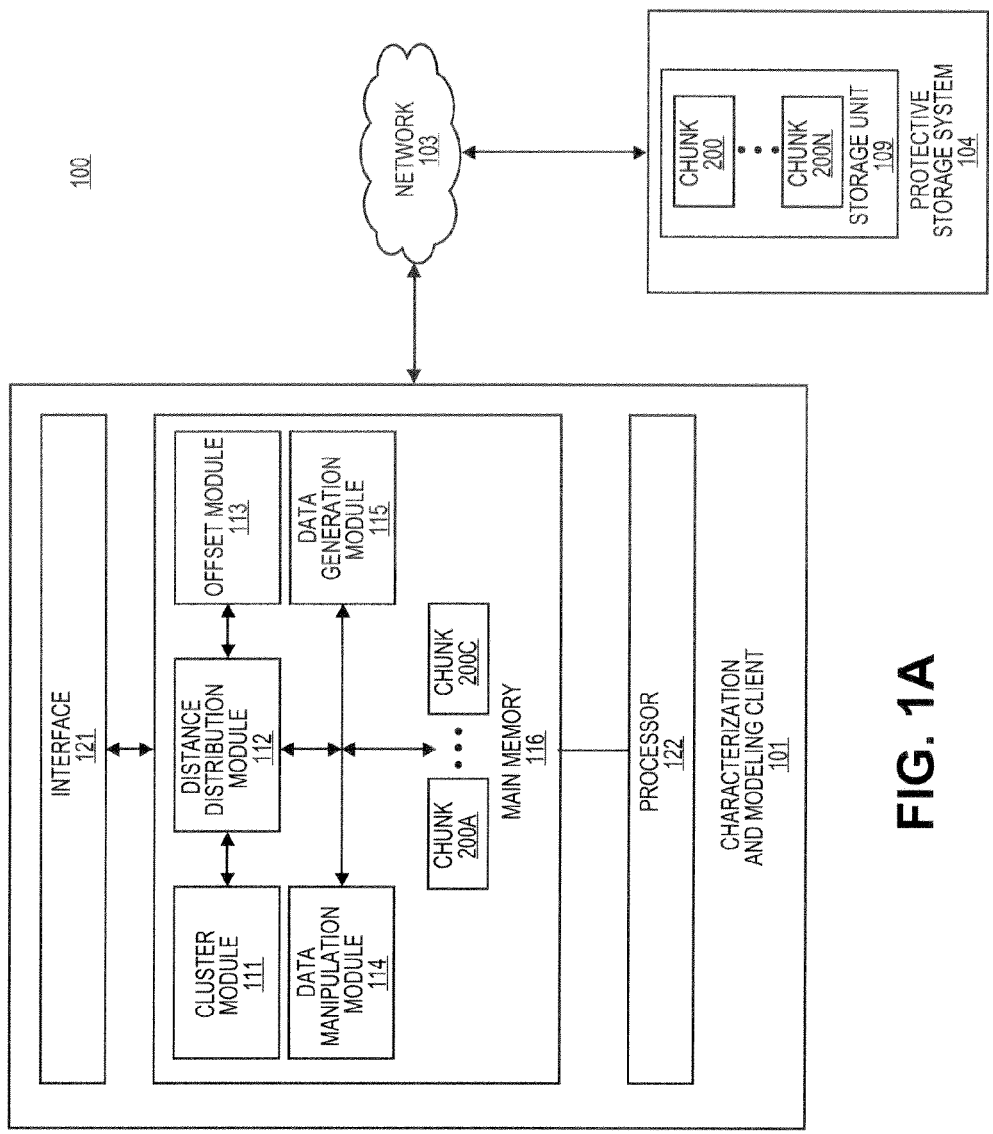
FIG. 1A is a block diagram of one embodiment of a system for characterizing and modeling a virtual synthetic system.

FIG. 1A is a block diagram illustrating a virtual synthetic system according to one embodiment of the invention. Referring to FIG. 1A, virtual synthetic system 100 includes, but is not limited to, characterization and modeling client 101 communicatively coupled to a protective storage system 104 over network 103. Characterization and modeling client 101 can be any type of client such as a server, a personal computer (e.g., desktops, laptops, and tablets), a "thin" client, a personal digital assistant (PDA), a Web-enabled appliance, a gaming device, a media player, or a mobile phone (e.g., Smartphone), etc. Network 103 can be any type of network such as a local area network (LAN), a wide area network (WAN) such as Internet, a corporate intranet, a metropolitan area network (MAN), a storage area network (SAN), a bus, or a combination thereof, wired and/or wireless. In an alternative embodiment, network 103 does not couple client 101 and protective storage system 104; rather, protective storage system 104 is locally located at client 101.

Protective storage system 104 can include any type of server or cluster of servers that can communicate with a client system (e.g., I/O operations between protective storage system 104 and characterization and modeling client 101). Protective storage system 104 is adapted to facilitate data protection through data protective actions such as backups, archives, disaster recovery storage, long-term retention, snapshot retention, and other similar data protection actions. Accordingly, protective storage system 104 can be, for example, a storage server used for any of various different purposes, such as to provide multiple users with access to shared data, to back up mission-critical data, to archive data, to provide disaster recovery storage, to provide long-term retention, and/or to act as a snapshot repository. Protective storage system 104 can be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Protective storage system 104 can be implemented as part of an archive and/or backup system such as a de-duplication storage system available from EMC® Corporation of Hopkinton, Mass. Protective storage system 104 can have a distributed architecture, or all of its components can be integrated into a single unit.

In one embodiment, protective storage system 104 includes storage unit 109 which can operate as an active storage to receive and store external or fresh user data; a second storage unit (not shown) can operate as a target storage unit to periodically archive data from the active storage unit according to an archiving policy or scheme. Storage unit 109 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage unit 109 and additional storage units (not shown) can also be combinations of such devices. In the case of disk storage media, the storage unit 109 can be organized into one or more volumes of Redundant Array of Inexpensive Disks (RAID).

In protective storage system 104, data can be arranged in storage unit 109 as a dataset of chunks 200-200$n$. Storage unit 109 can contain any number of chunks and/or datasets. The data chunks for a particular dataset can be maintained sequentially or distributed over multiple storage units. The data chunks can have any size, for example, the data chunks can be 512 kilobytes (KB). The data chunks can have a uniform size or can vary in size. Metadata regarding the organization and relationships and similar information for the data chunks and the datasets can also be stored at protective storage system 104 or a database management system (not shown) so that it is accessible by client 101 over network 103. In one embodiment, protective storage system 104 is agnostic to the arrangement of a dataset into chunks 200-200$n$ at storage unit 109—i.e., a dataset is stored at storage unit 109, but that dataset is identified as a collection of chunks 200-200$n$ only by client 101.

In one embodiment, characterization and modeling client 101 includes, but is not limited to, several components: interface 121; processor 122; and main memory 116 including cluster module 111, distance distribution module 112, offset module 113, data manipulation module 114 and data generation module 115. Modules 111-115 located at main memory 116 of client 101 are adapted to program processor 122 to generate and manipulate a dataset such as a dataset separated into chunks 200-200$n$ at storage unit 109 of protective storage system 104.

Modules 111-115 are each adapted to program processor 122 to perform specific operations within client 101, some of which are described herein. In one embodiment, data generation module 115 is adapted to generate random data for a first generation dataset, such as those represented by chunks 200-200$n$ at storage unit 109. The random data can be generated using any random number generation process. The first generation dataset can be any size and can be organized as a set of data chunks or similarly organized. The first generation dataset can be stored in storage unit 109 or similarly stored. The first generation dataset can be directly replaced, modified or copied to form a second generation data set, which similarly can be stored at storage unit 109 or another similar storage unit (not shown). The data generation module 115 can receive a seed value for random number generation from a user or network administrator. Similarly, other configuration characteristics of the random data to be generated can be determined by configuration information defined by a network administrator or programmed default values.

Figure 2A:
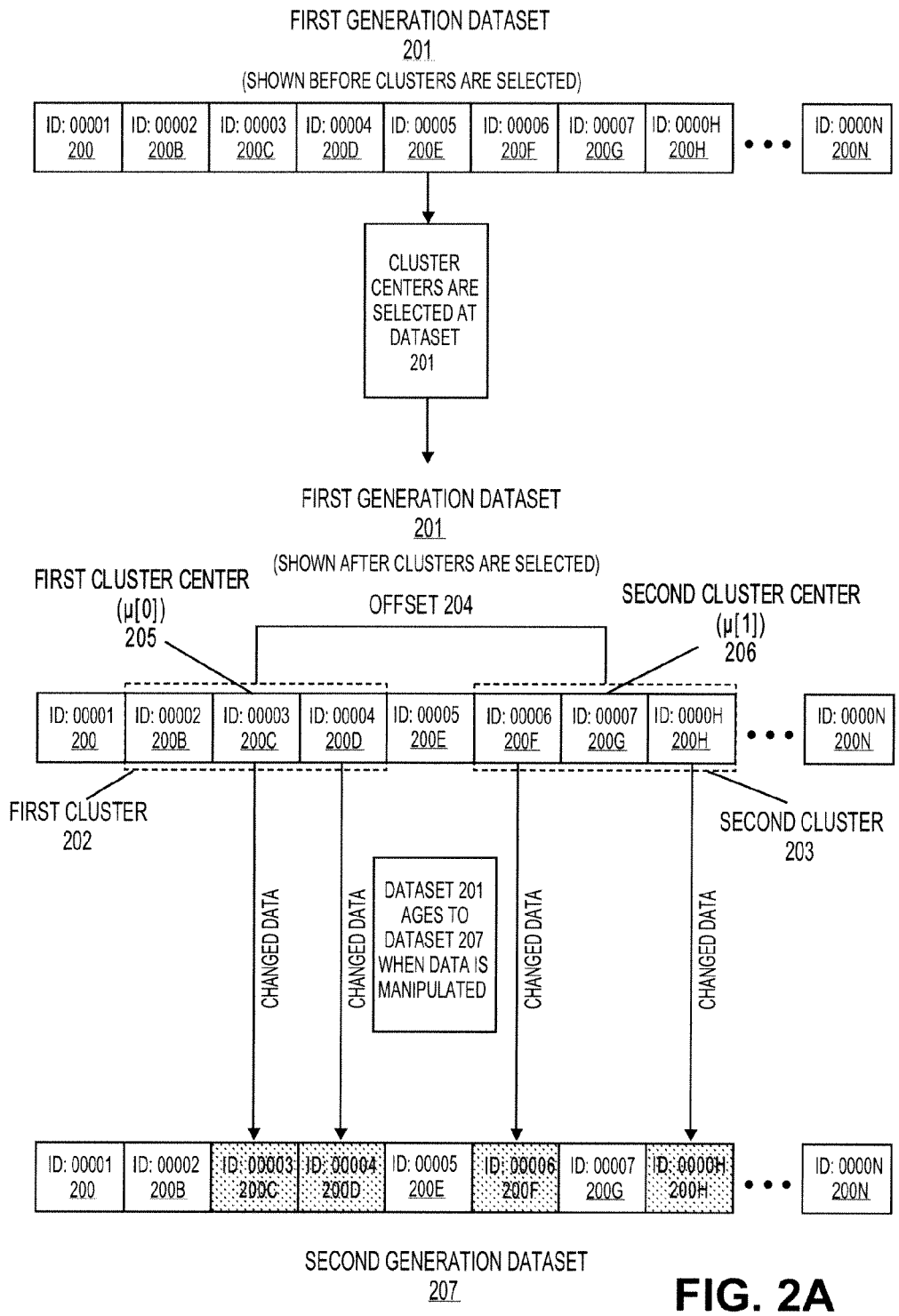
FIG. 2A is a block diagram illustrating a first generation dataset and a second generation dataset according to one embodiment of the invention.

Cluster module 111 is adapted to designate a first location on the first generation dataset as a cluster (e.g., first cluster 202 shown at FIG. 2A). According to one embodiment of the invention, cluster module 111 is adapted to designate the first location as a cluster by generating a random number and selecting as the center of the cluster a chunk having an identification number matching the randomly generated number. In another embodiment, the first cluster center is a function of the randomly generated number modulo (%) the total number of chunks in the dataset. The first cluster center can be known as the mu value for the first cluster—e.g., $\mu[0]$—in client 101.

Distance distribution module 112 is adapted to generate an offset based on a distance distribution function (e.g., offset 204 shown at FIG. 2A). Preferably, the offset is a measure between the center locations of two clusters (though, it can be measured in other ways); for example, the offset can be a measure between the first cluster designated by cluster module 111 and a next cluster to be designated by offset module 113. In one embodiment, the offset is generated by randomly sampling a distance distribution function that has a static array of one hundred integers. In some embodiments, the result of randomly sampling the distance distribution array returns a percentage into the dataset the next selected location should be offset.

Offset module 113 is adapted to offset a center of a next cluster (e.g., second cluster 203) from a center of a previous cluster by the generated offset. Offset module 113 separates the respective centers of the next and previous clusters by the offset generated by distance distribution module 112. In some embodiments, offset module 113 offsets the next cluster center from the previous cluster center by a quantity of chunks in the file system. Each nth cluster center can be known as the mu value for that nth cluster—e.g., $\mu[m]$ in client 101 where m is equal to n minus 1; thus, the second cluster center can be identified as $\mu[1]$. In one embodiment where the distance distribution function returns a percentage into the dataset, $\mu[m]$ can be calculated as $((\mu[m-1]+(\text{percentage returned from randomly sampling the distance distribution function}))\times(\text{total number of chunks in the dataset})) \% (\text{total number of chunks in the dataset})$.

Data manipulation module 114 is adapted to modify, delete or add data to the clusters selected by cluster module 111 and offset module 113. Data manipulation module 114 can be adapted to add data to at least one chunk at a cluster. Data manipulation module 114 also can be adapted to delete data from at least one chunk at a cluster—this can include deleting an entire chunk or segments from a chunk. Additionally, data manipulation module 114 can be adapted to modify data at least one chunk at a cluster.

In one embodiment, data manipulation module 114 manipulates chunks at a cluster according to a Gaussian distribution function. For example, a Gaussian random number generator can be constructed based on the center of a cluster $\mu[m]$ and a standard deviation $\sigma$ (provided by, for example, input at interface 121 or predefined at a data structure at client 101) for that cluster. A randomly generated number is then used to determine the location of chunks clustered around $\mu[m]$ to manipulate by, for example, using the random number to find an identification of the chunk or to find a location of the chunk (e.g., a chunk ID number) in the dataset or cluster, such as through an offset. This process can be repeated for a number of chunks to be manipulated at the cluster. The number can be determined in several different ways: a percentage or number of chunks in the cluster, a percentage or number of chunks in a dataset, through user input at interface 121, or any other similar method.

As described above, data modification and the associated processes to determine data to modify are carried out by client 101. However, in one embodiment client 101 does not buffer data or store data locally at client 101; rather, data modified by client 101 is read from storage unit 109 into main memory 116 and subsequently sent to protective storage system 104 to be stored at storage unit 109. Thus, in one embodiment only changed chunks or segments are written from client 101 to storage system 104. These changed chunks can then be locally applied to an earlier file using a file recipe (which can also be received from client 101 or protective storage system 104) dictating the structure of the file. Either one or both of client 101 and protective storage system 104 can track changes made to chunks (e.g., chunks 200-200n) or segments through a number of methods, such as maintaining a "dirty bit" indicating the chunk or segment has been modified since the last protective action. Also, client 101 can create all of chunks 200-200n to be stored at storage system 109, such as in the case of an initial creation of a dataset.

Figure 1B:
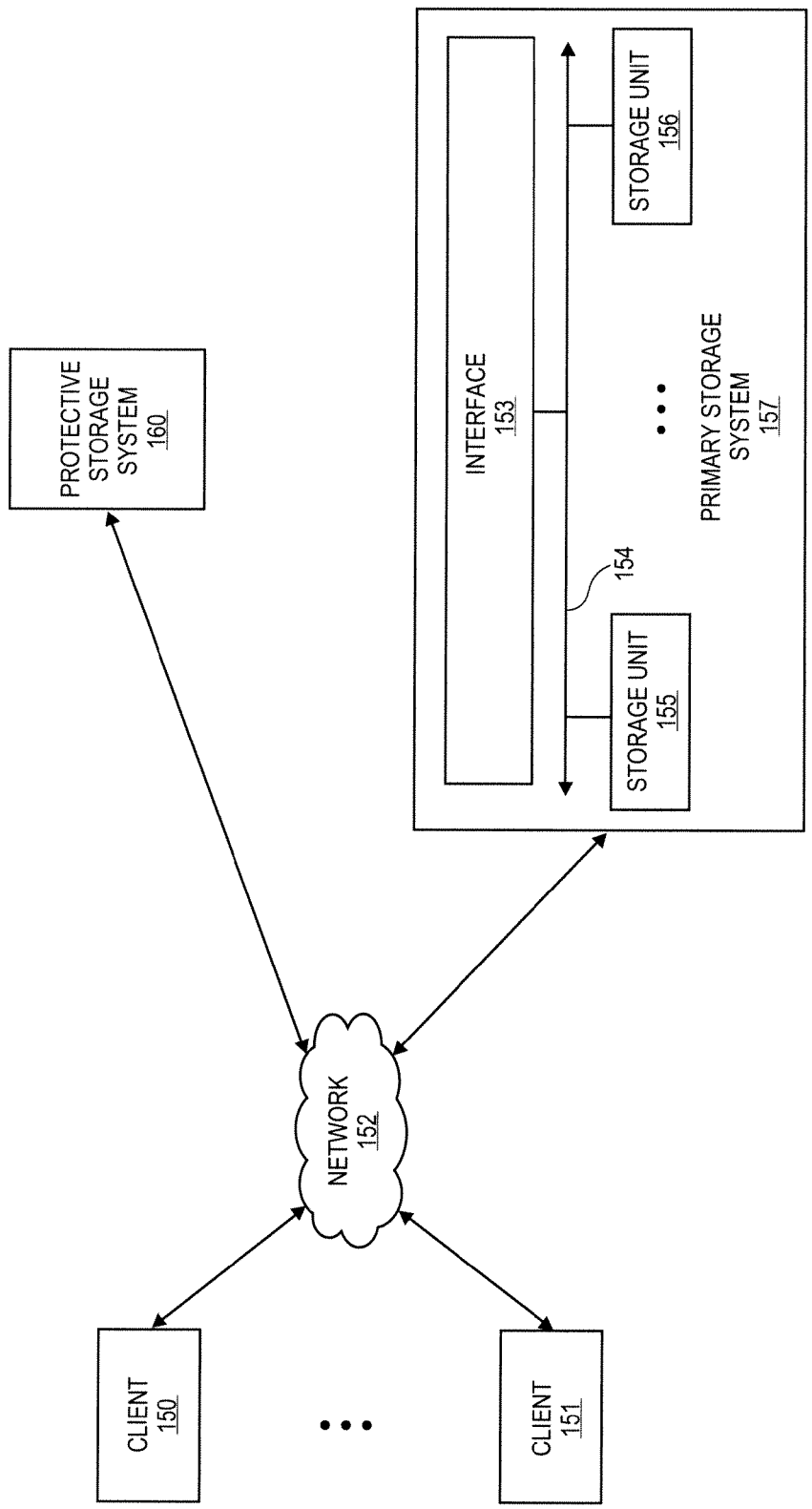
FIG. 1B is a block diagram of a virtual synthetic system simulated by an embodiment of the invention.

FIG. 1B illustrates a real-world storage system simulated by some embodiments of the invention, such as the embodiment shown at FIG. 1A. In some real-world scenarios, a workload is created when data is collected from a previous, older full file system and assembled with subsequent incremental changes to that file system. The incremental workload consists only of changed information. A synthetic workload would be used when time or system requirements do not allow for a full workload (e.g., a backup). For example, a full backup and an incremental backup can reflect changes to files by clients 150-151 at primary storage system 157 which are subsequently sent across network 152 and stored at protective storage system 160. In a real-world virtual synthetic system, the synthetic backup reads modified data from the primary system and stores it at the protective storage system. In real world scenarios, primary input/output (I/O) from clients 150-151 modifies data that is stored at the primary storage system 157. Typically, client modifications are localized within small regions of the data at storage units 155-156. For example, users at clients 150-151 tend to modify multiple files within a folder that would be near each other in a dataset stored at primary storage system 157. In relation to FIG. 1A, the interaction of clients 150-151 with primary storage system 157 and protective storage system 160 is simulated by the interaction of characterization and modeling client 101 with protective storage system 104. However, real-world data at primary storage system 157 and protective storage system 160 is typically not organized into chunks; rather, the organization of data into chunks as shown at FIG. 1A is only performed at system 100 to simulate real-world data manipulation. The embodiment of FIG. 1A models the aging of a real-world backup shown at FIG. 1B effected by backing up changes at clients 150-151 stored at primary storage system 157 to protective storage system 160. Thus, the modification of chunks around a cluster center by characterization and modeling client 101 parallels the pattern of data modification by real-world clients 150-151.

Figure 2B:
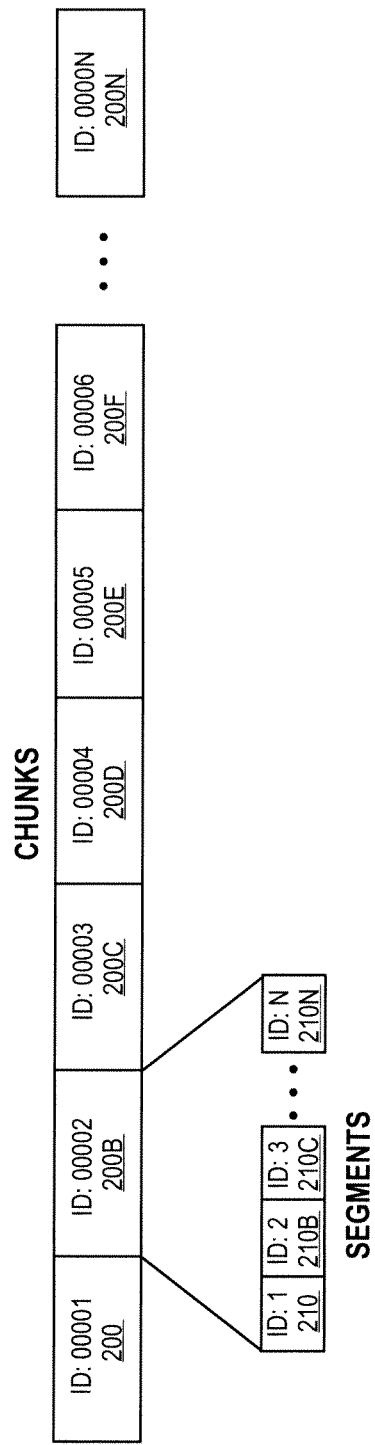
FIG. 2B is a block diagram illustrating a dataset that is divided into chunks, where each chunk is composed of segments, according to one embodiment of the invention.

According to some embodiments, a first generation dataset 201 is modeled as a sequence of data chunks, with each data chunk consisting of approximately ten data segments. A data segment is a relatively small unit of data at first generation dataset 201 and can vary in size from one byte to sixty-four kilobytes (KB). An embodiment of this configuration is illustrated at FIG. 2A. In this figure, a dataset is structured as chunks 200-200n; these chunks correspond to chunks 200-200n of the protective storage system 104 residing at storage unit 109 of FIG. 1A. In the aggregate, chunks 200-200n compose a first generation dataset 201. Importantly, although this is labeled as a first generation dataset, dataset 201 can represent any prior generation dataset—i.e., dataset 201 is not necessarily the first dataset ever to exist at a storage unit, rather dataset 201 can be a prior generation dataset that has had some data on it manipulated as described herein. Similarly, second generation dataset can be a next generation dataset—i.e., a dataset created by manipulating some data at a prior generation dataset. In FIG. 2A, first generation dataset 201 is depicted as a dataset of twenty gigabytes (GB); however, this dataset can be of any size. Expanding upon first generation dataset 201 shown at FIG. 2A, FIG. 2B illustrates the structure of chunks 200-200n. Here, chunk 200b is magnified to illustrate segments 210-210n composing chunk 200b. Similar to chunk 200b, chunks 200-200n are divided into segments. FIGS. 2A and 2B are descriptive and not comprehensive. In some embodiments, a dataset, such as a dataset residing at storage unit 109, includes myriad chunks and each chunk is composed of an average of ten segments.

Still with reference to FIG. 2A, each chunk 200-200n can be identified in protective storage system 104 by a unique chunk identification (ID) number. For example, chunk 200 can have chunk ID number 1. Accordingly, protective storage system 104 of FIG. 1A can monitor (or track) chunks; for example, chunks with modified segments can be tracked. In some embodiments, sequential chunk ID numbers identify chunks that are consecutive in protective storage system 104 by, for example, being physically located next to one another at storage unit 109 and having sequential address locations at storage unit 109. Alternatively, or in addition to sequential chunk identifiers, a hash function, such as a Secure Hash Algorithm-1 (SHA-1) function or Message-Digest 5 (MD5) function, can provide the chunk ID numbers. In one embodiment, this information (e.g., chunk ID numbers) is accessible by client 101 across network 103.

In an embodiment of the chunks within protective storage system 104, a chunk has a "header" segment that identifies the segments within the chunk and contains other identification and maintenance information or similar metadata such as the exact size of the chunk, the address at protective storage system 104 of the chunk, an identification of a next consecutive chunk and/or previous chunk at protective storage system 104, a dirty bit to indicate the chunk has been changed at protective storage system 104 since the last protective action, and other information pertinent to maintaining the chunk at protective storage system 104. In one embodiment, chunks are maintained as a doubly linked list and therefore the chunk (or the header segment within the chunk) can identify the next consecutive chunk and the previous chunk. However, the first and last chunks at a storage unit would not point to a previous and a next consecutive chunk, respectively; although the last chunk can point to the first chunk as the next consecutive chunk. In one embodiment, this information is accessible by client 101 across network 103.

Turning to FIG. 2B, each segment 210-210n can be identified in protective storage system 104 by a unique segment identification (ID) number. For example, segment 210 can have segment ID number 1. Accordingly, protective storage system 104 of FIG. 1A can track segments; for example, modified segments can be tracked. In some embodiments, sequential segment ID numbers identify segments that are consecutive in a chunk by, for example, being physically located next to one another at chunk and having sequential address locations at a chunk (e.g., segments 210 and 210b). Alternatively, or in addition to sequential segment identifiers, a hash function, such as a Secure Hash Algorithm-1 (SHA-1) function or Message-Digest 5 (MD5) function, can provide the segment ID numbers. In one embodiment, this information (e.g., segment ID numbers) is accessible by client 101 across network 103.

In an embodiment of the segments composing the chunks, a segment has a "header" portion, which can be a number of bytes within the segment. The header portion can contain identification and maintenance information pertinent to maintaining the segment at protective storage system 104. For example, a segment's header can identify information such as the exact size of the segment, the address at protective storage system 104 of the segment, a dirty bit to indicate the segment has been changed at a client since the last protective action (e.g., backup, archive, etc.), a chunk to which the segment is assigned, and other information pertinent to maintaining the segment at protective storage system 104. In one embodiment, segments are maintained as a doubly linked list and therefore each segment can have an identification of a next consecutive segment and/or previous segment in protective storage system 104. However, the first and last segments within a chunk would not point to a previous and a next consecutive segment, respectively; although the last segment can point to the first segment as the next consecutive segment. In one embodiment, this information is accessible by client 101 across network 103.

In some embodiments, identification and maintenance information, such as the information presented above with respect to segments and chunks, can be maintained in protective storage system 104 and accessed by characterization and modeling client 101. Thus, protective storage system 104 can track identification and maintenance information separate from, or in addition to, storing such information at the chunks and/or segments. For example, protective storage system 104 can have a database management system (not shown) to store this information; this database management system can be accessible by client 101 over network 103. In such embodiments, chunk information, such as chunk ID and chunk location in memory, is maintained at a chunk table with fields such as chunk_id, chunk_addr, etc. Similarly, segment information, such as segment ID, segment location in memory and associated chunk ID, can be maintained at a segment table with fields such as segment_id, segment_addr, chunk_id, etc. Alternatively, identification and maintenance information can be stored in data structures (not shown) at protective storage system 104 accessible by client 101 (e.g., as part of storage unit 109).

In some embodiments, a chunk's positional relationship relative to other chunks can be evaluated at protective storage system 104. For example, a center chunk can have a positional relationship to two other chunks: a next consecutive chunk and a previous chunk. In one embodiment, these two chunks are physically located after and before the center chunk in a storage unit (e.g., storage unit 109), respectively. Protective storage system 104 and/or client 101 can track (or monitor) this relationship through sequential chunk IDs. In the context of FIG. 2A, chunk 200e assigned chunk ID 5 can be a center chunk having previous chunk 200d, assigned chunk ID 4, and next consecutive chunk 200f, assigned chunk ID 6. Alternatively, protective storage system 104 and/or client 101 can track the positional relationship of chunks based primarily on an assigned chunk ID number without respect to the physical location of chunks at protective storage system 104. In one embodiment, this information is accessible by client 101 across network 103.

Analogous to the positional relationship of chunks in a storage system, a segment's positional relationship relative to other segments can be evaluated at protective storage system 104. For example, a center segment can have a positional relationship to two other segments: a next consecutive segment and a previous segment. In one embodiment, these two segments are physically located after and before the center segment in a storage unit (e.g., storage unit 109), respectively. Protective storage system 104 and/or client 101 can track (or monitor) this relationship through sequential segment IDs. In the context of FIG. 2B, segment 210b assigned segment ID 2 can be a center segment having previous segment 210, assigned chunk ID 1, and next consecutive segment 200c, assigned segment ID 3. Alternatively, protective storage system 104 and/or client 101 can track the positional relationship of segments based primarily on an assigned segment ID number without respect to the physical location of segments at protective storage system 104. In one embodiment, this information is accessible by client 101 across network 103.

Turning back to FIG. 2A, clusters 202-203 are shown at first generation dataset 201. To accurately model changes to a dataset (e.g., first generation dataset 201), a Gaussian distribution function can be applied so that data is not modified uniformly across a dataset, but instead reflects some regions—i.e., clusters—demonstrating an elevated rate of modification to the data. Thus, where u is a mean value for a location on a dataset demonstrating a high rate of modification (e.g., a center chunk of a cluster) and a is the standard deviation of the data modification for the cluster, Gaussian distribution approximates data modification rates at a first generation dataset such that:

$$f(x; \mu, \sigma^2) = \frac{1}{\sigma\sqrt{2\pi}} e^{-\frac{(x-\mu)^2}{2\sigma^2}}$$

Alternatively, other distribution functions can be used. Accordingly, changes to clusters 202-203 of first generation dataset 201 can reflect real-world data modification rates that follow a distribution function such as a Gaussian function. The size of the clusters is expressed according to the embodiment. In one embodiment, clusters are measured as a number of chunks. In other embodiments, clusters can be a number of segments or bytes. The number of chunks in each cluster varies according to the embodiment, but must be reconciled with a clusters-per-gigabyte constraint if such a constraint is applicable to the particular embodiment.

The center location of clusters 202-203 can represent a mean value of data modification in the real world—that is, a location on the dataset wherein a cluster of changes is centered. In some embodiments the center location represents a mean value for a rate of change of the first generation dataset 201 and is therefore known as mu ($\mu$). In some embodiments, $\mu$ is an address, chunk or segment at protective storage system 104 such that an equal number of bytes statistically likely to be modified by a distribution function (e.g., a Gaussian distribution function) are located on each side of the address, chunk or segment, respectively; in this way, a cluster can be selected. Illustratively, FIG. 2A depicts first cluster center ($\mu[0]$) 205 and second cluster center ($\mu[1]$) 206 for clusters 202 and 203, respectively.

In relation to $\mu$, the size of a cluster (e.g., clusters 202-203) can be represented by a standard deviation—sigma ($\sigma$)—of the rate of change to at least a portion of a dataset wherein $\mu$ has the highest change rate for that portion. In some embodiments, $\sigma$ controls the size of clusters—e.g., $\sigma$ can control the number of chunks statistically likely to be modified around a cluster center. $\sigma$ can be a specific number of chunks. However in one embodiment, $\sigma$ is based on a percentage of bytes over the size of the entire dataset. In such an embodiment, $\sigma$ can be a percentage of the dataset in bytes, and the chunk-level sigma of a cluster is obtained as the product of the number of chunks in the dataset multiplied by σ; the product can be a fraction or rounded up or down to reflect an integer number only. Sigma (σ) can be received as user input at interface 122, or can be a predefined value stored at, for example, a data structure at client 101 or at a database management system (not shown). For clarity, clusters 202-203 are shown as spanning only three data chunks. However, clusters 202-203 can be of any size (limited, of course, by the size of the dataset) and that size is not necessarily clearly demarcated; rather, a cluster represents an area with a statistically high likelihood of having changed chunks. The number of clusters per gigabyte (GB) in a dataset can be defined as a constraint on the number of clusters that can be located on each gigabyte of a dataset. A clusters-per-GB constraint or variable can be based on real-world data and stored at, for example, a data structure at client 101 or at a database management system.

Figure 3:
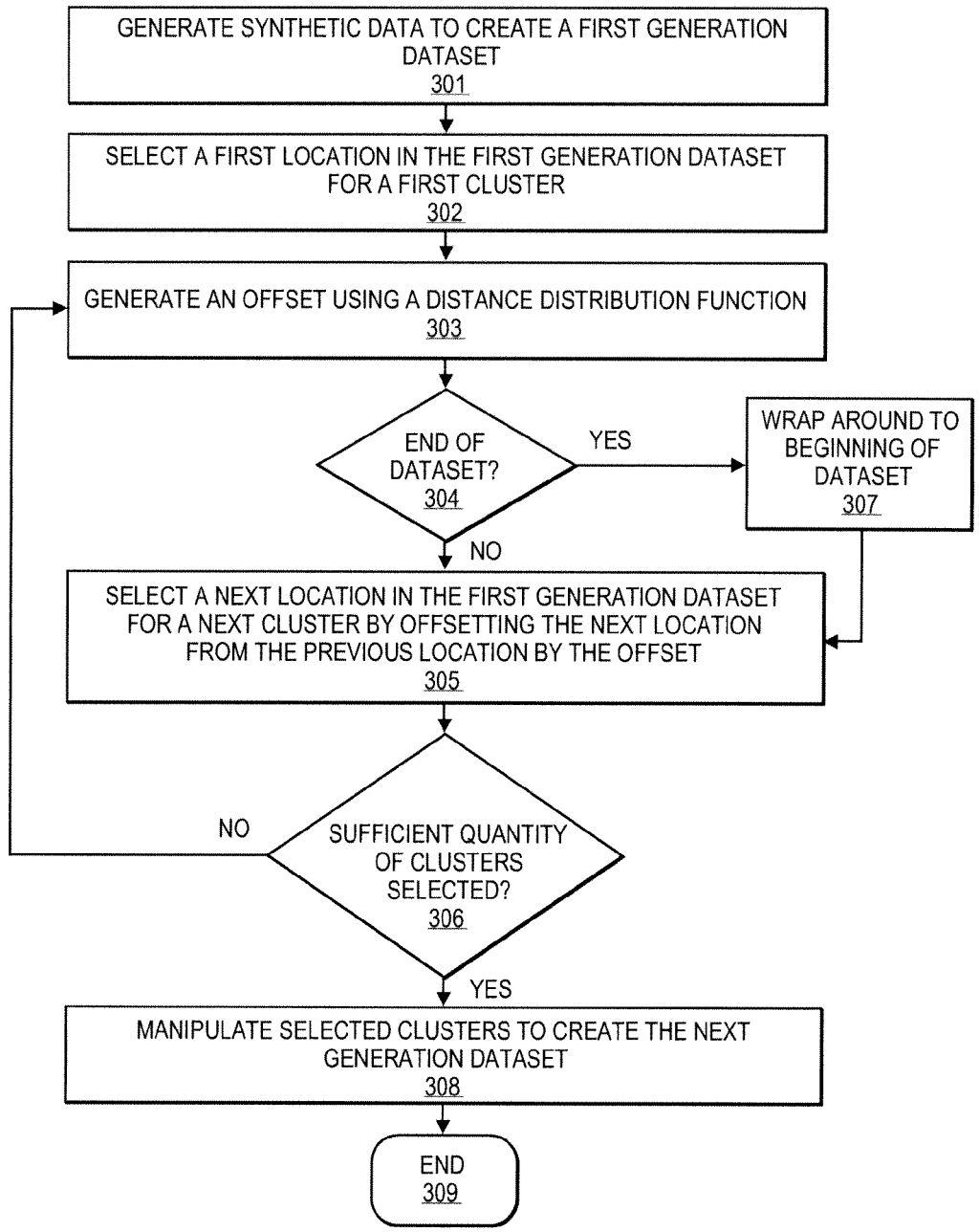
FIG. 3 is a flowchart of one embodiment illustrating a method for characterizing and modeling virtual synthetic workloads.

Now with reference to FIG. 3, a flow diagram is shown illustrating a method for modeling virtual synthetic file system workloads according to one embodiment of the invention. The method shown can be executed by client 101 of FIG. 1A at one of data residing at storage unit 109 of protective storage system 104. Furthermore, the method of FIG. 3 can be performed on first generation dataset 201 having chunks 200-200n shown at FIG. 2A (n.b., dataset 201 can correspond to chunks 200-200n at storage unit 109 of FIG. 1A).

The method of FIG. 3 begins at operation 301 wherein synthetic data is generated to create a first generation dataset. This first generation dataset can be immediately stored at storage unit 109 of protective storage system 104. In one embodiment, synthetic data is any anonymized data—i.e., data that is absent of any confidential or identifying information. Synthetic data can be as simple as random data, but can include any data that does not identify confidential information. In one embodiment, this data is randomly generated by data generation module 115. Alternatively, the first generation data is generated by anonymizing a real-world dataset. In even another embodiment, the first generation dataset is received at client 101 as input. For example, the input can be received as user input through interface 121. In one embodiment, this operation 301 is omitted. Thus, the method of FIG. 3 begins at operation 302 on a prior generation dataset. A prior generation dataset can have a structure analogous to first generation dataset 201 shown at FIG. 2. In such an embodiment, the next generation dataset created at operation 308 can be analogous to second generation dataset 207 of FIG. 2.

Having satisfactorily generated a first generation dataset, the method of FIG. 3 advances to operation 302 wherein a first location of a first cluster in the first generation dataset is selected. In one embodiment, cluster module 111 selects a location for the first cluster on first generation dataset 201 by selecting a center location (i.e., μ[0]) of the first cluster. In some embodiments, the location of the first cluster is selected as a random position in the dataset. For example, to select a chunk in the dataset as the first center location of the first cluster, a random number is generated and divided by the total number of chunks in the first generation dataset, the modulus is the first center location (e.g., μ[0]). In the context of FIG. 2A, cluster 200c having ID 3 is selected as first cluster center 205. Accordingly, the first cluster is selected by selecting the center as first cluster center μ[0] 205 in the first generation dataset 201; thus, a number of bytes, chunks or segments (according to the embodiment) surrounding the cluster center are designated as the first cluster wherein the number is dictated by σ. FIG. 2A demonstrates a cluster size of three chunks: one chunk, chunk 200b, precedes first cluster center 205 in the dataset 201 and one chunk, chunk 200d, follows first cluster center 205 in the dataset 201. Thus, chunks 200b-200d are designated as the first cluster and as such are statistically likely to be modified according to, for example, a Gaussian distribution function. In alternative embodiments, the center location of the first cluster can be stored at a data structure or database management system or received as input at interface 121.

In embodiments of the invention, locations on the dataset are selected for subsequent clusters relative to the previous cluster (i.e., the cluster that was last positioned on the dataset). Accordingly, at operation 303 of FIG. 3 an offset from the previous cluster—here, the first cluster—is generated. This offset can be generated by distance distribution module 112 such that distance distribution module 112 programs processor 122 to generate the offset.

According to one embodiment, the offset is generated from a distance distribution function. The distance distribution function can use a static array of 100 integers stored at, for example, a data structure at client 101 or a database management system coupled thereto (not shown). The integers are not necessarily unique and indeed many integers can occur repeatedly in the array to reflect a real-world occurrence frequency. For example, about fifty percent of modifications to a real-world dataset (e.g., a real-world dataset composed of chunks 158-158n stored at storage unit 155 of FIG. 1B) occur within a distance of one percent; therefore, the integer one would occur fifty times in the static array for the distance distribution function. In such an embodiment, the static array for the distance distribution function is randomly sampled to obtain an offset integer. However in some embodiments, the offset integer only represents a percentage of the dataset by which the two clusters are separated. Thus, the offset integer is converted to a practical offset in the dataset. The practical offset can be a number of chunks, a number of segments or a number of bytes. In embodiments wherein clusters are to be offset by a number of chunks, the offset integer is converted to a percentage and multiplied by the number of chunks in the dataset.

In the embodiment of FIG. 2A, the practical offset 204 is three chunks. Illustratively, if first generation dataset 201 includes 300 chunks and "1" is sampled from the static array for the distance distribution function indicating a percentage of chunks, then the practical offset would be calculated as three chunks. Similar techniques are utilized to generate a practical offset in bytes or segments. In even another embodiment, the offset is a number of address locations added to a base address in order to get to a specific absolute address. Here, the base address is the address at protective storage system 104 of the center of the previously positioned cluster (e.g., first cluster center 205) and the specific absolute address is the address at protective storage system 104 at which to position the center of the next cluster (e.g., second cluster center 206).

In the embodiment shown at FIG. 3, decision block 304 determines if the end of the dataset has been reached. Because datasets are of finite length, the method described at FIG. 3 can generate an offset that extends beyond the end of the dataset. In such a situation the method proceeds to operation 307, where the offset reaches to the end of the dataset and subsequently "wraps around" the dataset by either continuing the offset from the beginning of the dataset so that the next cluster is offset from the beginning of the dataset by the remainder, or alternatively, generating a zero offset such that the next cluster is positioned at the beginning of the dataset (e.g., by offsetting the cluster center from the beginning of the dataset by $(\frac{1}{2})(\sigma)$ or another order of σ). As an example, consider a generated offset of five chunks from chunk 200n at first generation dataset 201 of FIG. 2A and a σ value dictating three chunks as a cluster. Because this offset extends past the end of first generation dataset 201, the offset wraps around dataset 201 at operation 307. Here, the method of FIG. 3 can use the offset to select the center location for the next cluster; thus chunk 200e would be the center for the next cluster. Alternatively, operation 307 can wrap around dataset 201 by selecting the first chunks of the dataset as the location for the next cluster so that chunk 200b would be the center for the cluster. Similar techniques apply when clusters and offsets are measured in segments and bytes.

Resuming the method of FIG. 3, the offset generated at operation 303 is used to select a location for the next cluster—here, the second cluster—at operation 305. Similar to selecting a first location for the first cluster described above at operation 302, selecting the next location begins with selecting the center location for the next cluster. Each nth cluster center can be known as $\mu[m]$ in client 101 where m is equal to n minus 1 (e.g., the second cluster center, n equals 2, can be identified as $\mu[1]$). In the context of FIG. 1, the center location $\mu[m]$ can be selected by an offset module 113 adapted to use the offset generated by distance distribution module 112 by selecting a location on the dataset (e.g., first generation dataset 201) that is offset deeper into the dataset (e.g., located at a later address, or a greater chunk ID number in the case of sequential chunk IDs) from the center location of the previous cluster, $\mu[m-1]$. In the embodiment shown at FIG. 2A where offset 204 is four chunks, the second cluster center $\mu[1]$ 206 is placed at chunk 200g because chunk 200g is located four chunks apart from the first cluster center 205 at chunk 200c. In the embodiment where the offset obtained at operation 303 is a percentage into the dataset, $\mu[m]$ can be calculated as $((\mu[m-1]+(\text{offset from } 303))\times(\text{total number of chunks in the dataset})) \% (\text{total number of chunks in the dataset})$. Similar processes are performed for embodiments wherein clusters and offsets are designated in bytes and segments. Importantly, though offset 204 is shown as only spanning three chunks, FIG. 2A is to be regarded as illustrative to demonstrate how a next cluster is offset from a previous cluster. In most embodiments, the offset is more likely to be many times the offset 204—e.g., a generated offset can be 300 chunks.

With locations on the dataset selected as clusters, the method of FIG. 3 reaches decision block 306. At decision block 306, the method determines whether to continue iterations of selecting clusters on the dataset (e.g., first generation dataset 201). In one embodiment, this decision is based on the number of selections that have been made for each gigabyte of the dataset. As described above, a clusters-per-gigabyte constraint can be imposed upon the method. Accordingly, where each gigabyte of the dataset meets the clusters-per-gigabyte constraint, the method of FIG. 3 can continue to final operation 308. This requirement can be flexible or rigid—i.e., in one embodiment each gigabyte must have the exact number of clusters defined by the clusters-per-gigabyte constraint, but alternative embodiments can allow for some flexibility (e.g., a greater or fewer quantity of clusters per gigabyte, possibly within a predefined range). Correspondingly, the method continues to iterate by revisiting operation 303 where each gigabyte of the dataset does not have a satisfactory number of clusters located therein.

In some other embodiments, a percentage of the first generation dataset is specified such that the percentage of the first generation dataset must be selected as clusters before advancing to final operation 308. The percentage can be a percentage of bytes, chunks or segments, depending upon the particular embodiment. This percentage can be received as input at client through interface 121 and/or stored at, for example, a data structure at client 101 or at a database management system (not shown). In even another embodiment, a specific number of bytes, segments or chunks must be selected to be clusters on the first generation dataset before advancing to final operation 308. This specific number can be received as input at client 101 through interface 121 and/or stored at, for example, a data structure at client 101 or at a database management system.

Where a sufficient quantity of clusters is selected according to one of the embodiments of decision block 306, the method of FIG. 3 advances to final operation 308. At operation 308, the locations selected as clusters on the first generation dataset are manipulated to create the next generation of the data set; here, a second generation dataset. The embodiment shown at FIG. 2A shows a simple illustration of this creation. In this figure, chunks 200b-200d and 200f-200h of first generation dataset 201 have been selected as clusters 202 and 203 around cluster centers 205 and 206, respectively. Thus, chunks 200b and 200d are proximate to first cluster center 205 in dataset 201 according to a sigma value and are statistically likely to be modified according to a distribution function. According to an embodiment of operation 308 at FIG. 3, the chunks at clusters 202-203 are manipulated according to a distribution function (e.g., by selecting chunks according to the distribution function proximate to a cluster center). Any type or pattern of data can be utilized to modify the chunks in the clusters including the use of any predefined data set or process (e.g., applying an XOR operation to the data chunks or segments in the cluster). Any type of random number generation process can be utilized to generate random data to replace the data in the data chunks or data segments of the cluster. The data modification process can be consistent or vary across the clusters of the first generation data set. After the modifications, chunks 200b-200d and 200f-200h can house changed data (indicated by hatching at FIG. 2A) while retaining the same chunk ID and therefore the dataset has aged to become second generation dataset 207. In the context of FIG. 1A, chunks 200a-200c, a subset of the dataset having chunks 200-200n, stored at protective storage system 104 can be read into memory and manipulated at client 101 through data manipulation module 114. Subsequently, chunks 200a-200c are sent back to protective storage system 104 to be applied to the dataset having chunks 200-200n; consequently, the dataset ages to the next generation. Alternatively, the datasets can be generated by client 101 without reading from protective storage system 104 and then written to protective storage system 104.

In alternative embodiments, data can be manipulated by adding or deleting data at segments or chunks where data manipulation module 114 programs processor 122 to do so. Adding or deleting data to first generation dataset 201 at operation 308 creates the next generation dataset (e.g., second generation dataset 207) in a similar manner as described above for modifying clusters to create the second generation dataset.

Figure 5:
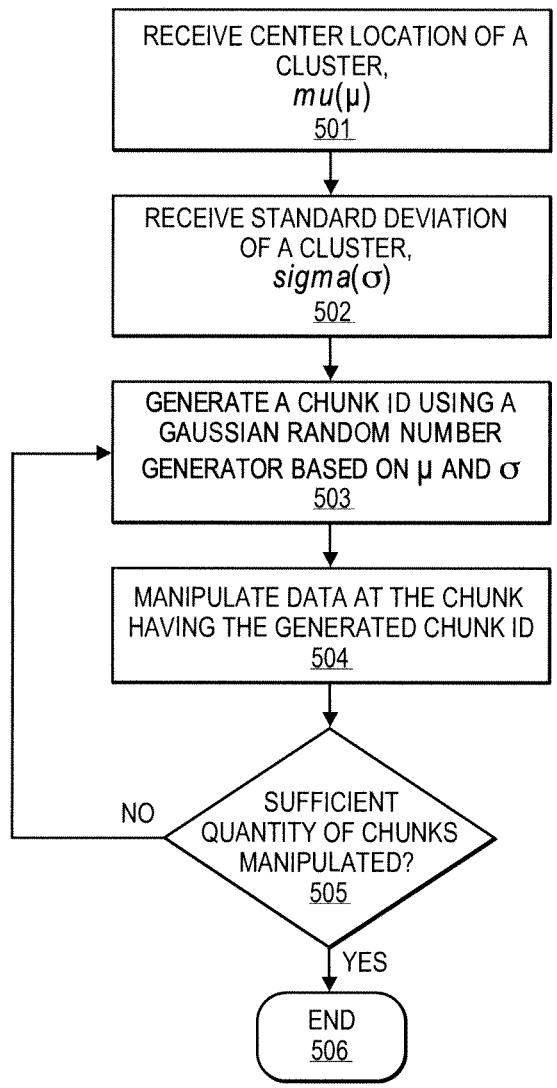
FIG. 5 is a flowchart of one embodiment illustrating data manipulation of a dataset.

Operation 308 can modify chunks at a cluster center according to a Gaussian distribution function so that only a portion of chunks at a cluster are manipulated. FIG. 5 illustrates how a Gaussian random number generator can determine the chunks to modify at a cluster. Data manipulation module 114 of FIG. 1A can program processor 122 to perform the method shown at FIG. 5 at chunks stored at storage unit 109. The method of FIG. 5 can be performed for any nth cluster at a dataset where the nth cluster has a cluster center $\mu[n-1]$—e.g., $\mu[m]$.

The method of FIG. 5 begins at operation 501 where the cluster center µ[m] is received by, for example, data manipulation module 114 or a Gaussian random number generator therein. The cluster center µ[m] can be received from cluster module 111 (where this nth cluster is the first cluster) and offset module 113 (where the nth cluster occurs after the first cluster). At the following operation, 502, the standard deviation (σ) of the nth cluster (which can be the same for all clusters) is received by, for example, data manipulation module 114 or a Gaussian random number generator therein. The standard deviation can be received at, for example, interface 122 as user input or can be a predefined value stored at a data structure at client 101 or at a database management system (not shown).

At operation 503 of FIG. 5, the method generates chunk IDs to manipulate at the nth cluster proximate to cluster center µ[m] according to σ. According to this embodiment, a Gaussian random number generator randomly generates numbers that can be used to locate chunks to manipulate; however, other distribution functions can be used to determine chunks to manipulate in other embodiments. Where, as here, a Gaussian random number generator is used, the values µ[m] and σ are used in the Gaussian distribution function of the random number generator such that:

$$f(x; \mu[m], \sigma^2) = \frac{1}{\sigma\sqrt{2\pi}} e^{-\frac{(x-\mu[m])^2}{2\sigma^2}}$$

Each randomly generated number is used to locate a chunk to manipulate. In the embodiment of FIG. 5, a number generated by the Gaussian random number generator can immediately correspond to a chunk ID in the dataset. Thus, at operation 504, the method manipulates data at the chunk having the generated chunk ID. As described above, data manipulation at a chunk can include add, deleting or changing data (e.g., by writing random data) to the entire chunk or just to parts (e.g., segments) of the chunk.

Following data manipulation at the randomly selected chunk at the cluster proximate to cluster center µ[m] according to σ, the method of FIG. 5 determines at decision block 505 if a sufficient quantity of chunks have been manipulated. The quantity can vary according to the embodiment; the quantity can be, for example, a percentage of the dataset or of the cluster or a specific number of chunks that can be predefined or received as input. Where decision block 505 determines that an insufficient quantity of chunks has been manipulated, the method revisits operation 503 for at least an additional iteration. Conversely, decision block 505 finds that a sufficient quantity of chunks has been manipulated, the method of FIG. 5 ends and, in some embodiments, the method of FIG. 3 resumes. In even another embodiment, it is determined that a sufficient quantity of chunks has been manipulated when the distribution function generates a chunk ID for a chunk that has already been manipulated. A chunk can be identified as already having been manipulated by a "dirty bit" as described above.

FIG. 5 effectively shows that not all chunks proximate to a cluster center (and therefore available to be manipulated) must in fact be manipulated—for example, a sufficient quantity of chunks around a cluster center can be manipulated and that quantity is not all chunks around the cluster center. This embodiment is illustrated by FIG. 2A where data at first generation dataset 201 is manipulated to create second generation dataset 207. Here, although chunks 200b-200d are statistically most likely to be manipulated (based on, for example, a sigma value), only chunks 200c-200d are manipulated. Thus, a Gaussian distribution function at operation 503 only generated the chunk IDs for chunks 200c-200d before decision block 205 determined that a sufficient quantity of chunks around first cluster center 205 had been manipulated. Similarly, only chunks 200f and 200h around second cluster center 206 were manipulated before decision block 505 determined that a sufficient quantity of chunks around second cluster center 206 had been manipulated.

Where an insufficient quantity of clusters have been selected at the first generation dataset (e.g., first generation dataset 201) according to decision block 306, the method of FIG. 3 begins another iteration at operation 303. Revisiting operation 303 of FIG. 3, the method again generates an offset using the distance distribution function. Accordingly, operation 305 selects a location for the center location of the next cluster by offsetting that center location from the center location of the previously positioned cluster. This iteration and subsequent iterations beginning at operation 303 traverse the method in the same manner described above, according to the particular embodiment. Iterations of the method continue until decision block 306 determines that a sufficient quantity of clusters have been selected at the first generation dataset 201. Subsequently, the clusters are modified at operation 308 to age first generation dataset 201 into second generation dataset 207 and the method ends at operation 309; or, alternatively, the method can terminate at operation 309 if the particular embodiment dictates modifying a cluster as soon as a location for the cluster is selected.

Figure 4:
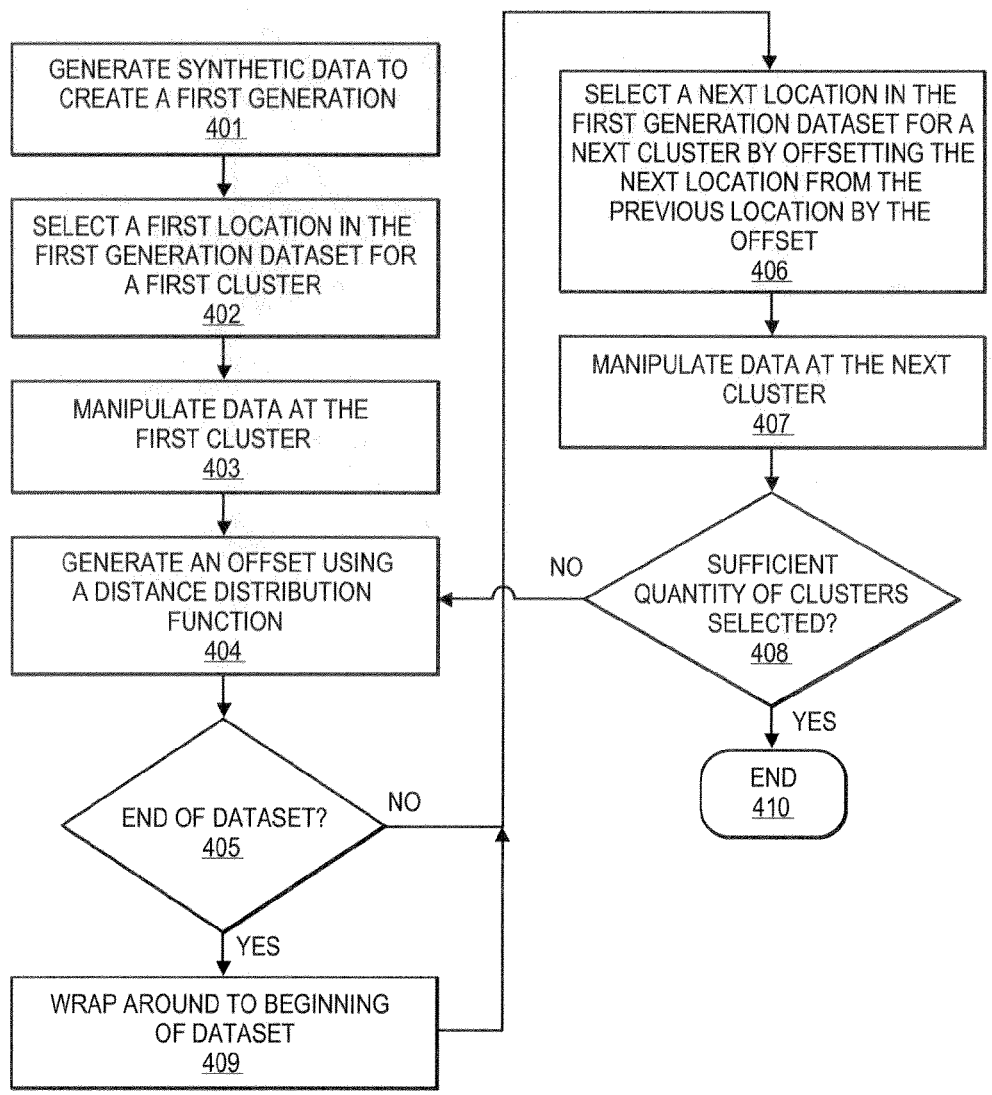
FIG. 4 is a flowchart of one embodiment illustrating a method for characterizing and modeling virtual synthetic workloads.

Turning to FIG. 4, a flow diagram is shown illustrating a method for modeling virtual synthetic file system workloads according to one embodiment of the invention. The method shown can be executed by client 101 of FIG. 1A at a dataset at storage unit 109. The method of FIG. 4 can be performed on first generation dataset 201 having chunks 200-200n shown at FIG. 2A (n.b., dataset 201 can correspond to a dataset having chunks 200-200n at storage unit 109 of FIG. 1A). The method is an alternative embodiment to the method shown at FIG. 3 and thus many operations are analogous to those described above with respect to FIG. 3. Effectively, FIG. 4 operates nearly identically to the method of FIG. 3, however in FIG. 4 data manipulation at clusters occurs immediately following the selection of each respective cluster as opposed to operation 308 shown at FIG. 3.

At the beginning, the method of FIG. 4 begins at operations 401 and 402, which are analogous to operations 301 and 302 described above. At operation 403, the method of FIG. 4 diverges from that shown at FIG. 3; here, data is manipulated at the first cluster. In one embodiment, chunks are generated by client 101 and written to system 104. In another embodiment, chunks to be manipulated are read from storage unit 109 of system 104 into main memory 116 of client 101. The manipulated chunks can then be sent to protective storage system 104 to be stored at storage unit 109. Operation 403 can be performed according to a Gaussian distribution function so that only a portion of chunks at a cluster are manipulated as described above with respect to FIG. 5. Subsequent operation 404 is analogous to operation 303, and the decision block 405 and operation to wrap around the dataset 409 are analogous to operations 304 and 307, respectively. Similarly, operation 406 is analogous to operation 305. At operation 407, however, the method again diverges from that shown at FIG. 3. At operation 407, data is manipulated at the next cluster n where n is offset from the previous cluster by the offset generated at operation 404 and has a cluster center µ[m]. In one embodiment, chunks are generated by client 101 and written to system 104. In another embodiment, chunks to be manipulated are read from storage unit 109 of system 104 into main memory 116 of client 101. The manipulated chunks can then be sent to protective storage system 104 to be stored at storage unit 109. Operation 407 can be performed according to a Gaussian distribution function so that only a portion of chunks at the next cluster are manipulated as described above with respect to FIG. 5. At next decision block 408, the method determines if a sufficient quantity of clusters have been selected. This determination is analogous to that made at operation 306 of FIG. 3. Where an insufficient quantity of clusters has been selected, the method of FIG. 4 returns to operation 404 to generate a next offset and iterate through the method again as described herein. Where a sufficient quantity of clusters has been selected, the method of FIG. 4 ends at operation 410. As client 101 modifies chunks and subsequently sends those chunks to protective storage system 104, system 104 can apply the changed chunks to the earlier full dataset of storage unit 109 having chunks 200-200$n$ to create a new, complete dataset reflecting up-to-date changes.

In subsequent iterations of the method of FIGS. 3 and 4, locations selected as clusters potentially overlap, for example, if the generated offset is insufficient to accommodate the designated cluster size or if decision blocks 304 or 406 require that the method wraps around the dataset at operations 307 and 407, respectively. In a simple embodiment, the method allows two clusters to overlap. Ultimately, data at the clusters located on the first generation dataset is to be manipulated by the methods shown; in this embodiment, it is not relevant that data is encompassed by more than one cluster—the data is to be modified regardless. Alternatively, the methods of FIGS. 3 and 4 can generate another offset from the overlap-causing offset using the data distribution function. For example, consider an offset generated at operation 303 that places a center location for a cluster at chunk 200$d$ of first generation dataset 201 where first cluster 202 already encompasses chunk 200$d$. In one embodiment, a new offset is generated at operation 303 and the next cluster location (operation 305) is offset from chunk 200$d$ using the newly generated offset. In even another embodiment, cluster overlap can indicate that a sufficient number of clusters are modified so that operation 308 is reached from decision block 306. Similar examples apply to the embodiment shown at FIG. 4.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer-implemented method for manipulating data in a file system, the data in the file system organized into chunk and clusters and datasets, each chunk being a plurality of bytes, each cluster being a plurality of chunks, each dataset including a plurality of clusters, where each dataset represents a subset of the data in the file system at a particular point in time, the method comprising:
   selecting, in a virtual synthetic system, a first chunk location in a first generation dataset of a first cluster, the first chunk and first cluster being in the file system;
   generating a first offset using a distance distribution function where the first offset is an integer enumerating one or more chunks, where the one or more chunks are in the file system;
   selecting a second chunk location in the first generation dataset of a second cluster, wherein the second chunk location is offset from the first chunk location by the first offset, the second chunk location and second cluster being in the file system; and
   manipulating data at each cluster selected on the first generation dataset thereby creating a second generation dataset.

2. The method of claim 1 wherein a chunk is a group of approximately ten consecutive segments of one byte to sixty-four kilobytes.

3. The method of claim 2 further comprising:
   receiving, into a virtual synthetic system, a percentage of bytes over the first generation dataset; and
   selecting a sigma value of the first cluster as a product of the percentage multiplied by a total number of chunks in the first generation dataset.

4. The method of claim 1 wherein the distance distribution function is a static array of integers representing a probability distribution for distance between clusters on a real world dataset.

5. The method of claim 1 wherein manipulating data comprises one of (a) deleting data from the first generation dataset, (b) adding data to the first generation dataset, and (c) modifying data existing at the first generation dataset by writing one of random data and anonymized data.

6. The method of claim 3, wherein offsetting the second chunk location from the first cluster by the first offset comprises:
   selecting a first center chunk of the first cluster; and
   selecting a second center chunk of the second cluster such that the second center chunk is offset into the first generation dataset from the first center chunk by the first offset.

7. The method of claim 1 wherein the manipulating is performed after one of selecting each cluster, and selecting all the clusters.

8. The method of claim 1 wherein the first chunk location is a first center chunk of the first cluster and the second chunk location is a second center chunk of the second cluster in the first generation dataset.

9. The method of claim 8 wherein manipulating data at each cluster selected comprises:
   selecting at least one chunk according to a distribution function proximate to a cluster center in the first generation dataset;
   manipulating data at the chunk.

10. The method of claim 9 wherein the distribution function is a Gaussian distribution function having a mu value equal to an identification number of the center chunk and a sigma value equal to one of a predefined value and a value received as input.

11. A computer-readable storage medium having instructions stored therein, which when executed by a processor of a computer, cause the processor to perform operations for manipulating data in a file system, the data in the file system organized into chunks and clusters and datasets, each chunk being a plurality of bytes, each cluster being a plurality of chunks, each dataset including a plurality of clusters, where each dataset represents a subset of the data in the file system at a particular point in time, the operations comprising:
   selecting, in a virtual synthetic system, a first chunk location in a prior generation dataset of a first cluster, the first chunk location and first cluster being in the file system;
   generating a first offset using a distance distribution function where the first offset is an integer enumerating one or more chunks, where the one or more chunks are in the file system;
   selecting a second chunk location in the prior generation dataset of a second cluster, wherein the second chunk location is offset from the first chunk location by the first offset, the second chunk location and second cluster being in the file system; and
   manipulating bytes at each cluster selected on the prior generation dataset thereby creating a next generation dataset.

12. A virtual synthetic system for manipulating data in a file system, the data in the file system organized into chunks and clusters and datasets, each chunk being a plurality of bytes, each cluster being a plurality of chunks, each dataset including a plurality of clusters, where each dataset represents a subset of the data in the file system at a particular point in time, the virtual synthetic system comprising:
   a main memory, the main memory being a non-transitory computer-readable medium; and
   a processor, the processor coupled to the main memory, the processor operable to execute a cluster module adapted to select a first chunk location on a first generation dataset as a first cluster, the first chunk location and first cluster being in the file system, a distance distribution module adapted to generate a first offset from a distance distribution function where the first offset is an integer enumerating one or more chunks, where the one or more chunks are in the file system, an offset module adapted to select a second chunk location on the first generation dataset as a second cluster, wherein the second chunk location is offset from the first chunk location by the first offset generated by the distance distribution module, the second hunk location and second cluster being in the file system, and a data manipulation module adapted to create a second generation dataset by manipulating data at the first and second clusters in the first generation dataset according to a distribution function.

13. The virtual synthetic system of claim 12 wherein the processor is further operable to execute a data generation module adapted to randomly generate data at the first generation dataset.

14. The virtual synthetic system of claim 12 wherein the first generation dataset is composed of chunks, wherein each chunk is composed of approximately ten segments and further wherein each segment is composed of approximately one to sixty-four kilobytes.

15. The virtual synthetic system of claim 12 wherein the distance distribution module is further adapted to generate a second offset and the offset module is further adapted to select a third chunk location on the first generation dataset as a third cluster wherein the third chunk location is offset from the second chunk location by the second offset.

16. The virtual synthetic system of claim 12 wherein the cluster module is adapted to select the first chunk location as a random chunk location on the first generation dataset.

* * * * *